United States Patent [19]

Chan

[11] Patent Number: 4,980,408

[45] Date of Patent: Dec. 25, 1990

[54] WATER-BORNE SURFACE PRINTING INKS

[75] Inventor: Steven Y. Chan, Belleville, N.J.

[73] Assignee: BASF Corporation, Parsippany, N.J.

[21] Appl. No.: 415,672

[22] Filed: Oct. 2, 1989

[51] Int. Cl.$^5$ ............................. C09F 1/00; C09F 1/04; C08L 51/00

[52] U.S. Cl. .................................... 524/504; 525/54.44

[58] Field of Search ...................... 524/504; 525/54.44

[56] References Cited

U.S. PATENT DOCUMENTS

| | | | |
|---|---|---|---|
| 3,929,701 | 12/1975 | Hall et al. | 525/54.44 |
| 4,322,326 | 3/1982 | Pyle | 525/54.44 |
| 4,552,592 | 11/1985 | Rudolphy et al. | 525/54.44 |
| 4,713,415 | 12/1987 | Lavengood et al. | 525/183 |
| 4,714,728 | 12/1987 | Graham et al. | 525/54.44 |

FOREIGN PATENT DOCUMENTS

| | | | |
|---|---|---|---|
| 3119637 | 12/1982 | Fed. Rep. of Germany | 525/54.44 |
| 06397 | 11/1986 | France | 525/183 |
| 13388 | 6/1968 | Japan . | |
| 123640 | 9/1980 | Japan | 525/183 |

*Primary Examiner*—John Kight, III
*Assistant Examiner*—Dennis R. Daley
*Attorney, Agent, or Firm*—Michael R. Chipaloski

[57] ABSTRACT

The invention relates to novel water-based surface and lamination printing ink compositions and to their use as surface printing inks for printing onto substrates and in particular for printing onto plastic substrates. The surface printing inks of the present invention are superior in printing aptitude and color strength.

5 Claims, No Drawings

WATER-BORNE SURFACE PRINTING INKS

BACKGROUND OF THE INVENTION

This invention relates to a novel water-borne ink, its composition and its use as a surface and lamination printing inks for printing on paper and plastic substrates such as polyolefin, polyester, polyamide and paper substrates coated with plastic polymers of this type. In addition, the invention is directed to the compositions based on novel acrylated polyamides in conjunction with styrene-butadiene latices for surface printing inks.

Liquid printing inks dry by solvent evaporation, usually with heat or air blower assistance.

Solvent systems may be either water systems which use water as a partial or total solvent, or systems using volatile organic solvents. Primary solvents are usually alcohols, though some contain other oxygenated solvents.

Commonly used film formers for printing onto plastic substrates are usually organic solvent based. Water based inks have found limited use and are typically made by raising the alkalinity (pH) of an ink system to solubilize carboxylic resins such as rosin resins, modified acrylics and other acidic film formers. Inks of this type have found limited applicability for printing onto plastic substrates.

SUMMARY OF THE INVENTION

The present invention is therefore directed to novel water-based surface and lamination printing ink compositions and to their use as surface printing inks for printing onto substrates and in particular for printing onto plastic substrates. The surface printing inks of the present invention are superior in printing aptitude and adhesion to high slip plastic surfaces.

The binder resin useful in the water-borne surface inks of the present invention is typically based on an acrylated rosin modified polyamide resin and a latex resin.

The acrylated rosin modified polyamide resin is used at from 5–70% preferably 7–50% by weight as part of the binder resin composition. Acrylated rosin modified polyamide can be prepared by a fusion process utilizing condensation chemistry. Suitable polymer compositions and the process used is detailed in copending U.S. Ser. No. 247,201 filed Sept. 21, 1988 of El-Hefnawi, Shah and Wasyliw and entitled Modified Carboxylated Polyamide Acrylics.

Polyamides useful according to this invention include any typically used in printing inks or as hot melt adhesives. Typical polyamides used include products offered by the Henkel Co. under the trade name Macromelts 6238, 6239, 6240; Versamid 750, 900, 930, 940 and 950 as well as well as Polyamides sold by Union Camp under the trade names Unirez 2220 and 2211.

It has been found that this acrylated rosin modified polyamide, when incorporated into a water-borne printing ink, results in a printing ink exhibiting superior printing aptitude and adhesion characteristics when used to print onto plastic substrates.

The latices useful in accordance with the present invention are latices of rubbery polymers. Generally, these latices have solids content from about 40 to 75 percent, preferably from about 45 to 55 percent by weight of the latex. The polymers may be one or more polymers selected from the group consisting of (i) synthetic polymers of up to 90 weight percent of a mixture of one more monomers selected from the group consisting of $C_{8-12}$ vinyl aromatic monomers which may be unsubstituted or substituted by a $C_{1-4}$ alkyl radical or a chlorine or bromine atom; $C_{1-4}$ alkyl and hydroxy alkyl acrylates; $C_{1-4}$ alkyl and hydroxy alkyl methacrylates; and $C_{2-6}$ alkenyl nitriles; up to 60 weight percent of a $C_{4-6}$ conjugated diolefin, which may be unsubstituted or substituted by a chlorine atom; and optionally up to 10 weight percent of one or more monomers selected from the group consisting of: (a) $C_{3-6}$ ethylenically unsaturated carboxylic acids; (b) amides of $C_{3-6}$ ethylenically unsaturated carboxylic acids, which amides may be unsubstituted or substituted at the nitrogen atom by up to two radicals selected from the group consisting of $C_{1-4}$ alkyl radicals and $C_{1-4}$ hydroxy alkyl radicals, (ii) natural rubber latex; and a mixture of either (i) or (ii).

DESCRIPTION OF THE PREFERRED EMBODIMENTS

In order to produce an ink composition according to the present invention, a vehicle is first prepared by mixing an aqueous solution of an acrylated rosin modified polyamide, and the latex resin. The pigment or dyestuff is dispersed in an alkali soluble styrenated acrylic resin. The vehicle and the pigment dispersion are mixed. This is followed by the addition of wax, an anti-foaming agent, surfactant(s) and further adding water as the occasion demands to thereby adjust such properties as viscosity, color appearance, etc.

The acrylated rosin modified polyamide is an essential ingredient in the ink formulation and promotes good adhesion, clean printing, excellent film wetting, and superior resolubility.

The latices useful in accordance with the present invention are latices of rubbery polymers. Generally, these latices have a polymer content from about 40 to 75 percent, preferably from about 45 to 55 percent by weight of the latex. The polymers may be one or more polymers selected from the group consisting of (i) synthetic polymers of up to 90 weight percent of a mixture of one more monomers selected from the group consisting of $C_{8-12}$ vinyl aromatic monomers which may be unsubstituted or substituted by a $C_{1-4}$ alkyl radical or a chlorine or bromine atom; $C_{1-4}$ alkyl and hydroxy alkyl acrylates; $C_{1-4}$ alkyl and hydroxy alkyl methacrylates; and $C_{2-6}$ alkenyl nitriles; up to 60 weight percent of a $C_{4-6}$ conjugated diolefin, which may be unsubstituted or substituted by a chlorine atom; and optionally up to 10 weight percent of one or more monomers selected from the group consisting of: (a) $C_{3-6}$ ethylenically unsaturated carboxylic acids; (b) amides of $C_{3-6}$ ethylenically unsaturated carboxylic acids, which amides may be unsubstituted or substituted at the nitrogen atom by up to two radicals selected from the group consisting of $C_{1-4}$ alkyl radicals and $C_{1-4}$ hydroxy alkyl radicals, (ii) natural rubber latex; and a mixture of either (i) or (ii).

Preferably the polymer is a copolymer of styrene and butadiene in a ratio of 20:80 to 80:20. The polymer may also be a reinforced polymer produced by blending; and optionally coagglomerating a soft polymer such as a high butadiene styrene-butadiene latex with a reinforcing resin such as a high styrene, styrene butadiene polymer.

Suitable monomers are well known in the art. The vinyl aromatic monomers include styrene and alpha methyl styrene and their homologues. Suitable acrylates include methyl acrylate, methyl methacrylate, ethyl acrylate, hydroxyethyl acrylates, ethyl methacrylate, hydroxy ethyl methacrylate, and their homologues. The most common nitrile is acrylonitrile.

Copolymerizable ethylenically unsaturated carboxylic acids include acrylic, methacrylic, itaconic and fumaric acids. Lower esters of those acids may also be present in the functional polymers. The functional polymer may also include aldehydes such as acrolein or amides of the above acrylamide, methacrylamide and N-methylol acrylamide.

The following are examples of the polyamide/styrene-butadiene ink suitable for surface printing flexible plastic films.

EXAMPLE I

| | Parts/Weight | |
|---|---|---|
| A | 14.0 | AAOT Yellow Pigment |
| B | 3.5 | Joncryl 67 |
| C | 1.0 | Ammonium Hydroxide (29%) |
| D | 21.5 | Water |
| E | 8.0 | Polyamide Resin Solution |
| F | 0.5 | Silicone |
| G | 4.0 | Jonwax 120 |
| H | 15.0 | Styronal ND 430 |
| I | 22.5 | Water |
| J | 10.0 | Isopropanol |

Resin B is dissolved in mixture of C and D. A slurry of A is made in the preceding solution and passed through a high speed fine media mill to achieve good pigment dispersion. Components E through J are added in the stated order while mixing.

The ink is reduced to printing viscosity using an 80/20 blend of water/n-propanol. The reduced ink had good color strength and ice-crinkle resistance with good adhesion. It was used as a general purpose ink for a flexible plastic support with good results.

EXAMPLE II

| | Parts/Weight | |
|---|---|---|
| A | 17.0 | Lithol Rubine Red Pigment |
| B | 4.0 | Joncryl 678 (S. C. Johnson) |
| C | 1.0 | Ammonium Hydroxide (29%) |
| D | 26.0 | Water |
| E | 5.0 | Polyamide Resin Solution |
| F | 1.5 | MPP 635 (Micropowders Inc.) |
| G | 0.5 | Silicone |
| H | 20.0 | Styronal ND 430 |
| I | 15.0 | Water |
| J | 8.0 | n-propanol |
| K | 2.0 | Butyl Cellosolve |

This ink formulation was formulated as in Example 1. This ink had good viscosity stability, high color strength and excellent ice-crinkle resistance.

EXAMPLE III

| | Parts/Weight | |
|---|---|---|
| A | 12.0 | Phthalocyanine Blue Pigment Green Shade |
| B | 3.0 | Morez 100 (Morton Chemicals) |
| C | 1.0 | Ammonium Hydroxide (29%) |
| D | 20.0 | Water |
| E | 10.0 | Polyamide Resin Solution |
| F | 0.5 | Defoamer |
| G | 1.5 | Aqua Polyfluo 411 (Micropowders, Inc.) |
| H | 15.0 | Styronal ND 846 |
| I | 27.0 | Water |
| J | 10.0 | n-Propanol |

The ink was formulated as in Example I. This ink was fast drying with excellent resolubility and scuff/scratch resistance. It also had excellent adhesion of flexible plastic films.

I claim:

1. A water-borne ink composition comprising a binder of an acrylated rosin modified polyamide resin and a carboxylated styrene butadiene latex composition.

2. The ink composition of claim 1 wherein the polyamide resin is 7–50% of the binder.

3. The ink composition of claim 1 wherein the latex composition is 50–93% of the binder.

4. The ink composition of claim 1 wherein the latex has a Tg of 60° C. to −30° C.

5. The ink composition of claim 1 wherein the latex composition is a copolymer of styrene and butadiene in a ratio of from about 20:80 to about 80:20.

* * * * *